(12) United States Patent
Touchet

(10) Patent No.: US 7,073,051 B2
(45) Date of Patent: Jul. 4, 2006

(54) SYSTEM FOR DISPLAYING INFORMATION ON SYSTEM START-UP

(75) Inventor: Thierry Touchet, Crolles (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 465 days.

(21) Appl. No.: 10/410,297

(22) Filed: Apr. 10, 2003

(65) Prior Publication Data

US 2003/0221093 A1 Nov. 27, 2003

(30) Foreign Application Priority Data

Apr. 11, 2002 (EP) .................................. 02354058

(51) Int. Cl.
*G06F 15/177* (2006.01)

(52) U.S. Cl. ....................... 713/1; 713/2; 710/1; 710/2; 710/305

(58) Field of Classification Search ................ 710/305, 710/1, 2; 713/1, 2
See application file for complete search history.

(56) References Cited

U.S. PATENT DOCUMENTS

| 5,964,873 | A  | * | 10/1999 | Choi ............................ 713/2 |
| 6,425,079 | B1 | * | 7/2002  | Mahmoud ...................... 713/2 |
| 6,791,572 | B1 | * | 9/2004  | Cloney et al. .............. 345/619 |
| 2003/0076330 | A1 | * | 4/2003  | Owen ......................... 345/581 |
| 2004/0015632 | A1 | * | 1/2004  | Nguyen et al. ............. 710/305 |

* cited by examiner

*Primary Examiner*—Thomas Lee
*Assistant Examiner*—Vincent Tran
(74) *Attorney, Agent, or Firm*—Foley & Lardner LLP

(57) ABSTRACT

A system for displaying information on start-up includes a display screen, a power supply, a data processor, system initialization routine software stored in a non-volatile memory, and one or more ancillary devices, the non-volatile memory including system critical information which is used during a system boot sequence by the system to enable the system subsequently to operate, and wherein the non-volatile memory includes system non-critical information relating to the identity of the manufacturer or supplier of one or more of the ancillary devices, and the system non-critical information is displayable on the display screen during the system boot sequence.

12 Claims, 1 Drawing Sheet

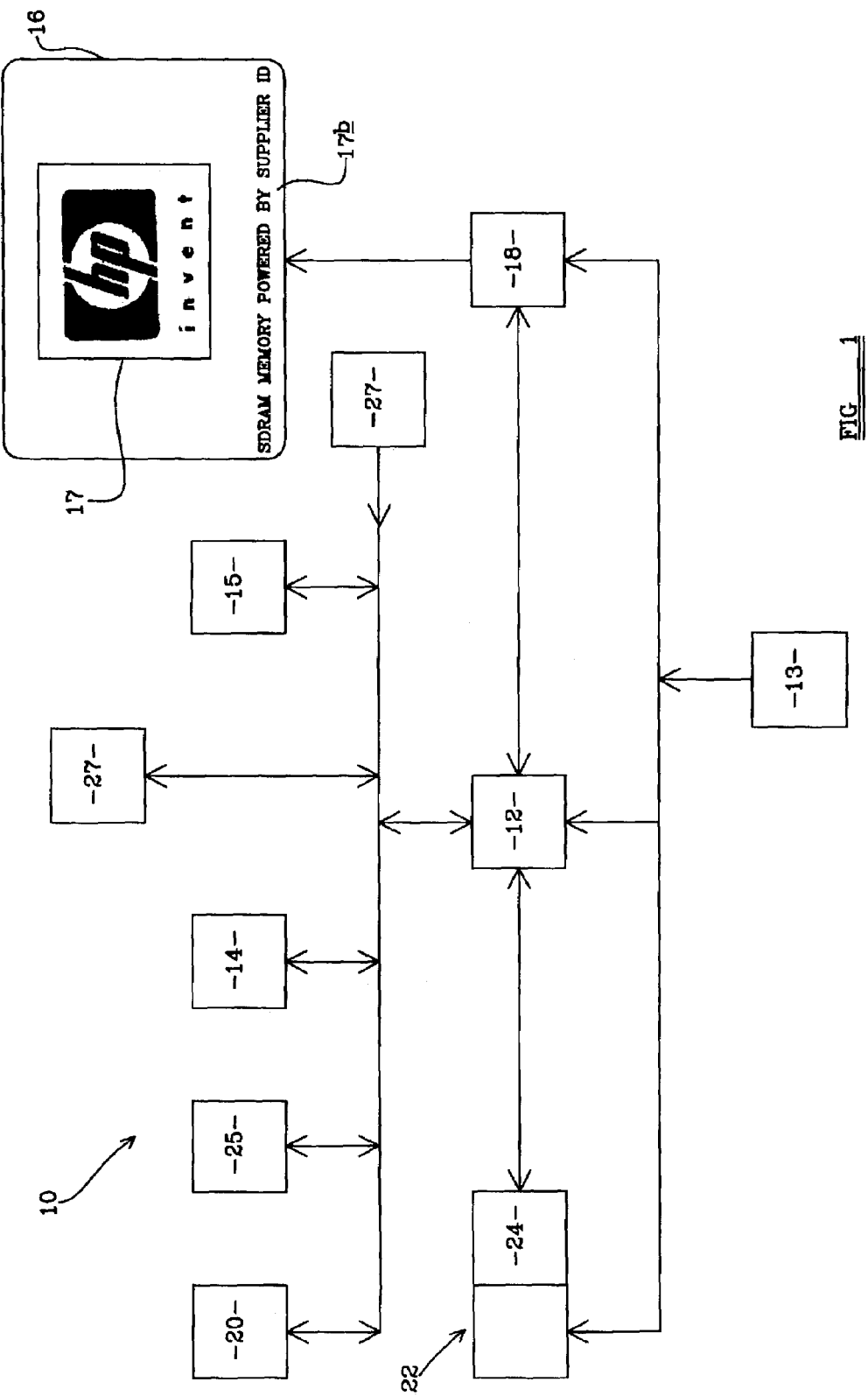

SYSTEM FOR DISPLAYING INFORMATION ON SYSTEM START-UP

This invention relates to a system including a display screen, a power supply, a data processor, and one or more ancillary devices, such as a volatile memory, and in which on system start-up during which an initialization routine is run, information is displayed on the display screen.

In such a system, initialization routine commands may be embedded in software, stored in a non-volatile memory.

DESCRIPTION OF THE PRIOR ART

Such systems are known in which the initialization routine software includes system critical information which is essential for operation of the system, the information being for hardware components such as the data processor and/or software components such an operating system.

SUMMARY OF THE INVENTION

The information which is displayed on the display screen during start-up may be a graphic or logo, and/or text. Typically in a conventional system, the information identifies the manufacturer or supplier of the system, the display during the system initialization routine being known as a splash screen. Such a graphic may be programmed into the initialization routine software during manufacture of the system. Alternatively or additionally during system start-up, information including one or more character strings derived from the ancillary devices of the system, for example identifying functional features of the ancillary device such as, where the device is RAM, the amount of RAM installed, may be displayed on the display screen.

The system may be a computer system having a display screen, and a power supply, a data processor, and one or more ancillary devices, or any other audio and/or visual system having a similar architecture, such as for examples only, a television or even a radio/CD player or the like, and the initialization routine software which commonly is known as a system BIOS, being stored in a non-volatile memory. However the invention may be applied to other apparatus such as for examples only, mobile telephones, GPS devices, or any audio/visual or other communication apparatus which includes a display screen and is computerized to the extent that a system BIOS or similar is required to store system critical information used during system start-up. Thus the power supply for the system may be a mains supply or a portable supply such as a battery power pack.

In a personal computer system, in which one of the ancillary devices is a volatile memory and another of the ancillary devices is a data storage device including a computer operating system such as Microsoft Windows or Linux for examples only, after initial system start-up, known as Power On Self Test (POST) when any graphic relating to the manufacturer of the system, which is stored in the system BIOS memory is displayed, and before the system BIOS commences booting of the operating system from the data storage device, an ASCII-graphics box may be displayed which may include system critical information concerning the type and configuration of the display screen, the data processor, and the ancillary devices.

To provide this system critical information, during POST the system BIOS reads a fixed character string from for example, a video card which drives the display screen, and from the ancillary devices. The system BIOS may itself have sufficient processing power to display the ASCII-graphics box on the display screen, or the system BIOS may instruct the operating system to display the box.

In manufacturing a system, ancillary devices typically are made by third party suppliers. System manufacturers take great care in selecting suppliers of ancillary devices to ensure that the devices meet the quality expectations of the system manufacturer. However a user of a system, most of which typically is contained within a casing, cannot readily appreciate the identity of the suppliers of the ancillary devices which are not viewable from exteriorly of the casing.

It is known to attach to the casing a badge to indicate that within the casing there is provided a device from a particular supplier (e.g. "Intel Inside").

However particularly but not exclusively in the case of volatile memory or RAM which is readily exchangeable in service by a system user, the original RAM may well be replaced by RAM from an alternative supplier. Thus an external badge will not indicate the supplier of the RAM which is in use.

Suppliers of ancillary devices and particularly but not exclusively RAM, desire that their identity is made known to users of systems of the kind with which the present invention is concerned.

According to one aspect of the invention we provide a system including a display screen, a power supply, a data processor, system initialization routine software stored in a non-volatile memory, and one or more ancillary devices, the non-volatile memory including system critical information which is used during a system boot sequence by the system to enable the system subsequently to operate, and characterized in that the non-volatile memory includes system non-critical information relating to the identity of the manufacturer or supplier of one or more of the ancillary devices, and the system non-critical information is used to display on the display screen a graphic during the system boot sequence.

Thus in accordance with the invention not only may information relating to the manufacturer of the system be displayed on the initial start-up or splash screen but the identity of the manufacturer/supplier of the ancillary device or devices may be displayed, using the system non-critical information stored in the non-volatile memory.

In the event that an ancillary device for which there is system non-critical information stored in the non-volatile memory, is exchanged, with modern flash BIOS memories, such as EEPROMS, replacement system non-critical information may be stored in the non-volatile memory relating to the identity of the manufacturer or supplier of the replacement ancillary device, so that the replacement system non-critical information is displayed during the system boot sequence.

The system non-critical information graphic may be a logo and/or text.

The invention has particularly but not exclusively been developed where the system is a computer system and the ancillary device for which system non-critical information is stored in the system BIOS memory, is a volatile memory e.g. RAM.

Such a computer system typically would include a data storage device such as a hard disc, including a (software) computer operating system, and ancillary devices such as one or more floppy/CD ROM or the like disc drives, one or more ports, a pointing device, a keyboard and the like.

According to a second aspect of the invention we provide a method of performing a system boot sequence for a system including a display screen, a power supply, a data processor, system initialization routine software stored in a non-volatile memory, and one or more ancillary devices, the method including activating the power supply, and while the system initialization routine software performs the system boot sequence, retrieving from the nonvolatile memory system critical information necessary for the system subsequently to operate, and using system non-critical information relating to the identity of the manufacturer or supplier of one or more of the ancillary devices from the non-volatile memory to display a graphic on the display screen.

The system may include a video driver device to drive the display screen in which case the method may include initiating the video driver device to enable the graphic subsequently to be displayed on the display screen.

The system initialization routine software may perform other functions prior to the graphic being displayed, for example a POST, and during and/or subsequent to displaying the graphic, where the system is a computer system including a data storage device including a computer operating system, the system initialization routine software may locate the data storage device and boot the computer operating system.

The method may be applied particularly to display a graphic relating to the identity of the manufacturer or supplier of an ancillary devices being a volatile memory or RAM.

According to a third aspect of the invention we provide a method of displaying information on a display screen relating to the manufacturer or supplier of one or more ancillary devices of a system during a system boot sequence, the system including a display screen, a power supply, a data processor, system initialization software stored in a non-volatile memory, and one or more ancillary devices, the non-volatile memory including system critical information which is used during the system boot sequence by the system to enable the system subsequently to operate, and characterized in that the method includes retrieving from the non-volatile memory system noncritical information relating to the identity of the manufacturer or supplier of one or more of the ancillary devices, and using the system non-critical information to display a graphic on the display screen during the system boot sequence.

BRIEF DESCRIPTION OF THE DRAWINGS

The invention will now be described with reference to the accompanying drawing, FIG. 1, which is an illustrative representation of a system according to the invention.

DETAILED DESCRIPTION OF THE PREFERRED EMBODIMENTS

Referring to the drawing, FIG. 1, there is shown a computer system 10 which includes a data processor 12, a power supply 13, a data storage device 14, a keyboard 15, and a display screen 16. The display screen 16 is driven from a video driving device or video card 18. A volatile memory e.g. RAM 20 is also provided to store data for immediate use by the processor 12. The system further includes other ancillary devices namely a pointing device 25 such as a mouse, trackball or the like, serial/parallel/USB ports 27, and at least one floppy/CD ROM or the like disc drive 25.

It will be appreciated that when the power supply 13 is first activated, the RAM 20 will be empty of any data. The processor 12 is programmed in such circumstances to look to a system initialization routine which is a series of commands embedded in software, or a system BIOS 22, for basic system 10 critical information necessary for the subsequent operation of the system 10, and then the system BIOS 22 and processor 12 will continue to perform a system boot sequence as follows.

Upon receiving a power good signal from the power supply 13 to indicate that a steady power supply is available, the processor 12 is reset and may commence execution of a system critical start-up program stored in a non-volatile memory or ROM 24 of the system BIOS 22.

The system BIOS 22 program may first search for a video card 18 which typically will have its own built in BIOS, and the video card 18 is initialized. The video card's own BIOS, where provided, may be arranged to display on the display screen 16 information relating to the video card, stored within a nonvolatile memory of the video card's 18 own BIOS.

The system BIOS 22 program may search for other devices which may have non-volatile memories or ROM in a local BIOS, and where found, any programs in such other ROM memories may be run.

The system BIOS 22 will then display an initial start-up or splash screen, using system non-critical information stored in the non-volatile memory 24 in which the system BIOS 22 is stored, to generate a graphic.

It is known to program into the system BIOS 22 commands to display a graphic including information relating to the system 10 manufacturer. For example, on the display screen 16 depicted in the drawing, the applicant's own "HP" logo 17a is shown being displayed. This splash screen remains displayed while the system BIOS 22 program executes a further sequence of boot steps as described below and may remain being displayed for a time determined by the system BIOS 22.

In accordance with the present invention, the system BIOS 22 includes commands to display from the memory 24 thereof, system non-critical information relating to the identity of the manufacturer or supplier of one or more ancillary devices of the system, particularly in this example, relating to the manufacturer/supplier of the RAM 20. This system non-critical information is used during start up of the system to create a graphic which appears on the display screen 16.

Shown on the display screen 16 in the drawing, in addition to the applicant's own "HP" logo 17a, is a graphic 17b including for instance the words "SDRAM Powered by Supplier ID". In accordance with the invention, the graphic 17b with information relating to the manufacturer/supplier of the RAM 20 may be displayed concurrently with another graphic such as the graphic 17a with information relating to the system 10 manufacturer, or instead of or consecutively to (before or after) a graphic with information relating to the system 10 manufacturer.

The system non-critical information which is stored in the non-volatile memory 24 depends on agreement with the manufacturer/supplier of the RAM 20, and in order to create the graphic 17b system non-critical information both in the memory 24 and in the memory module(s) is required.

Preferably the display screen 16 is arranged to display a graphic 17b with information relating to
- the type of RAM 20 installed; in the present case the RAM 20 is indicated to be "SDRAM"; and/or
- the name of the RAM 20 manufacturer or supplier; in the present case this is indicated to be "Supplier ID"; and/or
- a relationship between the system 10 manufacturer and the RAM 20 manufacturer/supplier; for example "recommended by" or the like.

While the splash screen is being displayed, the system BIOS 22 may continue to execute the system 10 boot sequence program, by testing the system 10, including the usual RAM 20 count-up test, and performing a system 10 inventory in which the system BIOS 22 tests that the expected ancillary devices i.e. the data storage device 14, the keyboard 15, logical devices such as COM and LPT ports 27 etc. are present. The system BIOS 22 may read a fixed character string for each device identified so that subsequently, an ASCII-graphics box being a summary of the system 10 configuration may be displayed on the display screen 16. The system BIOS 22 may configure the various ancillary devices as desired.

Subsequently to the system 10 boot sequence, the system BIOS 22 may boot and hand over to the computer operating system stored on the data storage device 14, control. The data storage 14 will usually will be a so called hard disc: Thus the computer system 10 may then be used to execute programs.

In the event that in service the RAM 20 originally provided by the system 10 manufacturer is exchanged, e.g. during a RAM 20 upgrade, with for example RAM 20 from another manufacturer/supplier with which the system manufacturer/supplier has agreement, the system non-critical information in the non-volatile memory 24 may create a graphic relating to the new manufacturer/supplier of the RAM 20 as the BIOS 22 will recognize the new manufacturer's/supplier's memory modules.

For another example, if the RAM 20 is exchanged with a different manufacturer's/supplier's RAM 20, with which the system 10 manufacturer has no agreement, the splash screen displayed on the display screen 16 during the system 10 boot sequence may then omit any information relating to the manufacturer/supplier of an additional RAM 20 module. In another example, if the manufacturer/supplier of an additional RAM 20 module is approved, the BIOS 22 may use the non-critical information in the non-volatile memory 24 to create a graphic with information relating to the manufacturer/supplier of the added RAM 20 module in additional to the original RAM 20 manufacturer/supplier.

The system non-critical information of the BIOS 22 may thus be a software program stored in the BIOS 22 and memory 24 which is able to identify manufacturer/supplier information from the RAM 20 where the RAM 20 is provided with suitably configured information, and then create an appropriate graphic for display on the display screen.

In the event that for example, the system 10 manufacturer reaches agreement with an additional or replacement RAM 20 manufacturer/supplier, the system non-critical information stored in the non-volatile memory 24 may be reprogrammed as necessary.

Thus the non-volatile memory 24 in which of the system BIOS 22 is stored may be an electrically erasable read only memory (EEPROM) to enable the ROM 24 thus to be reprogrammed.

Preferably the system non-critical information in the non-volatile memory 24 is protected from being replaced by an unauthorized user. Typically the system 10 manufacturer and/or the manufacturer or supplier of the replacement RAM 20, may replace the system non-critical information in the non-volatile memory 24 by accessing the memory 24 over the internet when requested to do so by the system owner.

Alternatively, such reprogramming may be achieved by a software program stored on the data storage device 14, which may for example be supplied with the replacement RAM 20.

It will be appreciated that the present invention presents marketing opportunities for strategic development of co-marketing operations with RAM 20 suppliers. Moreover the invention may be applied to display during a system 10 boot sequence a graphic with information relating to the kind/manufacturer/supplier of other devices of the system 10, particularly devices such as the hard disc 14 which like the RAM 20 is not exteriorly visible to a user of the system 10, as such devices are conventionally encased, with the processor 12, power supply 13, video card 18 and system BIOS 22 within a casing.

Although the invention has been described as being applied to a system 10 being a computer system 10, the invention may be applied to other audio and/or visual devices, GPS devices, PDAs or any other apparatus having a display screen which requires system initialisation during which a system boot sequence is performed and which preferably has a similar architecture to the computer system 10 described above, although of course such alternative system may not include a hard disc 14 or other disc drives 25, a keyboard 15 or pointing device 26, or even ports 27, although may have alternative ancillary devices such as a tape playing mechanism, a radio tuner etc.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A system comprising:
   a display screen,
   a power supply,
   a data processor,
   a non-volatile memory,
   system initialization routine software stored in the non-volatile memory, and
   one or more ancillary devices,
   wherein the non-volatile memory includes system critical information which is used during a system boot sequence by the system to enable the system subsequently to operate,
   wherein the non-volatile memory includes system non-critical information relating to the kind and/or the identity of the manufacturer or supplier of one or more of the ancillary devices, and
   wherein the system non-critical information is used to display, on the display screen, a graphic during the system boot sequence, and
   wherein the system non-critical information is used by the system in order to identify a manufacturer of each of the one or more ancillary devices based on information provided by the one or more ancillary devices, and
   wherein, when the system is not able to identify a manufacturer of at least one of the one or more ancillary devices using the system non-critical information, the system non-critical information displays, on the display screen, information concerning the at least one of the one or more ancillary devices that indicates that a manufacturer of the at least one of the one or more ancillary devices is not an approved manufacturer with respect to a manufacturer of the system.

2. A system according to claim 1 wherein the non-volatile memory is a flash or EEPROM memory.

3. A system according to claim 1 wherein the system is a computer system and the ancillary device for which system non-critical information is stored in the non-volatile memory, is a volatile memory.

4. A system according to claim 3 wherein the computer system includes at least one of a data storage device including a computer operating system, a disc drive, one or more ports, a pointing device, and a keyboard.

5. A system according to claim 1 wherein the system critical information is executed by the system in parallel with the system non-critical information being executed by the system.

6. A method of performing a system boot sequence for a system including a display screen, a power supply, a data processor, system initialization routine software stored on a non-volatile memory, and one or more ancillary devices, the method comprising:

activating the power supply, while the initialization routine software performs the system boot sequence, retrieving, from the non-volatile memory, system critical information necessary for the system subsequently to operate, and using system non-critical information relating to the kind and/or the identity of the manufacturer or supplier of one or more of the ancillary devices from the non-volatile memory, to display a graphic on the display screen, wherein the step of using system non-critical information further comprises:

attempting to identify a manufacturer of each of the one or more ancillary devices based on information provided by the one or more ancillary devices, and when the system is not able to identify a manufacturer of at least one of the one or more ancillary devices using the system non-critical information, displaying, on the display screen, information concerning the at least one of the one or more ancillary devices that indicates that a manufacturer of the at least one of the one or more ancillary devices is not an approved manufacturer with respect to a manufacturer of the system.

7. A method according to claim 6 wherein the system includes a video driver device to drive the display screen, the method including initiating the video driver device to enable the graphic subsequently to be displayed on the display screen.

8. A method according to claim 6 wherein the system initialization routine software performs a Power On Self Test prior to the graphic being displayed, and during and/or subsequent to displaying the graphic, wherein the system is a computer including a data storage device including a computer operating system, the system initialization software locating the data storage device and booting the computer operating system.

9. A method according to claim 6 wherein the method is applied to display a graphic using system non-critical information, including information, relating to the identity of the manufacturer or supplier of an ancillary device being a volatile memory.

10. A method according to claim 6 wherein the system critical information is executed by the system in parallel with the system non-critical information being executed by the system.

11. A method of displaying information on a display screen relating to the manufacturer or supplier of one or more ancillary devices of a system during a system boot sequence, the system including a display screen, a power supply, a data processor, initialization software stored in a non-volatile memory, and the one or more ancillary devices, the method comprising:

storing, in the non-volatile memory, system critical information which is used during the system boot sequence by the system to enable the system subsequently to operate, retrieving, from the non-volatile memory system, non-critical information relating to the kind and/or the identity of the manufacturer or supplier of one or more of the ancillary devices, and using the system non-critical information to display a graphic on the display screen during the system boot sequence, wherein the step of using system non-critical information further comprises:

attempting to identify a manufacturer of each of the one or more ancillary devices based on information provided by the one or more ancillary devices, and when the system is not able to identify a manufacturer of at least one of the one or more ancillary devices using the system non-critical information, displaying, on the display screen, information concerning the at least one of the one or more ancillary devices that indicates that a manufacturer of the at least one of the one or more ancillary devices is not an approved manufacturer with respect to a manufacturer of the system.

12. A method according to claim 11 wherein the system critical information is executed by the system in parallel with the system non-critical information being executed by the system.

* * * * *